(No Model.)

2 Sheets—Sheet 1.

J. W. DOWNS.
FERTILIZER AND SEED DISTRIBUTER.

No. 319,469. Patented June 9, 1885.

Witnesses:

Inventor:

(No Model.)  2 Sheets—Sheet 2.

J. W. DOWNS.
FERTILIZER AND SEED DISTRIBUTER.

No. 319,469.  Patented June 9, 1885.

Witnesses:  Inventor:

UNITED STATES PATENT OFFICE.

JAMES W. DOWNS, OF BOWDON, GEORGIA.

FERTILIZER AND SEED DISTRIBUTER.

SPECIFICATION forming part of Letters Patent No. 319,469, dated June 9, 1885.

Application filed July 26, 1884. (No model.)

*To all whom it may concern:*

Be it known that I, JAMES W. DOWNS, a citizen of the United States, residing at Bowdon, in the county of Carroll and State of Georgia, have invented certain new and useful Improvements in Fertilizer and Seed Distributers; and I do hereby declare the following to be a full, clear, and exact description of the invention, such as will enable others skilled in the art to which it appertains to make and use the same.

My invention relates to fertilizer and seed distributers, and is especially adapted to the sowing of cotton-seed, and has for its objects to regulate the quantity of fertilizer and of seed that shall be sown, to drop the fertilizer at or near the plow, so that it will be placed in the furrow quite as deep as the plow cuts, and then be covered with soil from the furrow before the seed is dropped, and, finally, to evenly and sufficiently cover the seed after it has been deposited in the furrow on top of the fertilizer, whereby labor and expense are saved and most desirable results follow; and to these ends it consists in the construction and the combination of parts hereinafter particularly described and specifically defined.

Figure 1:
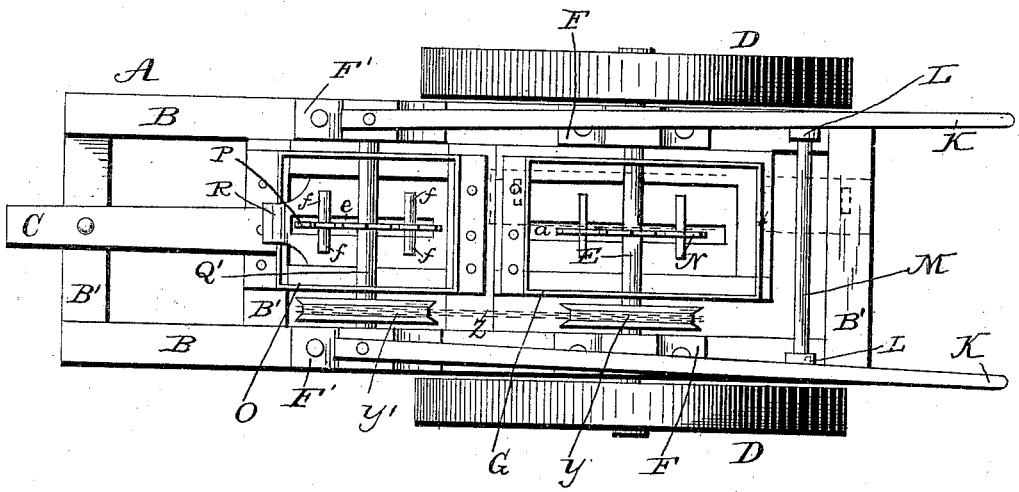
Figure 2:
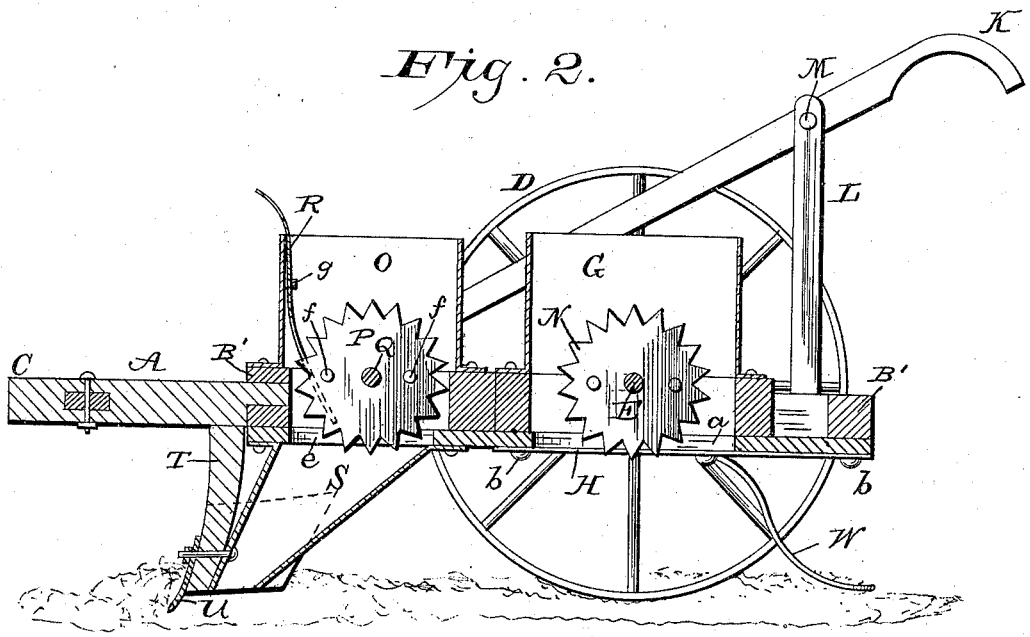
Figure 3:
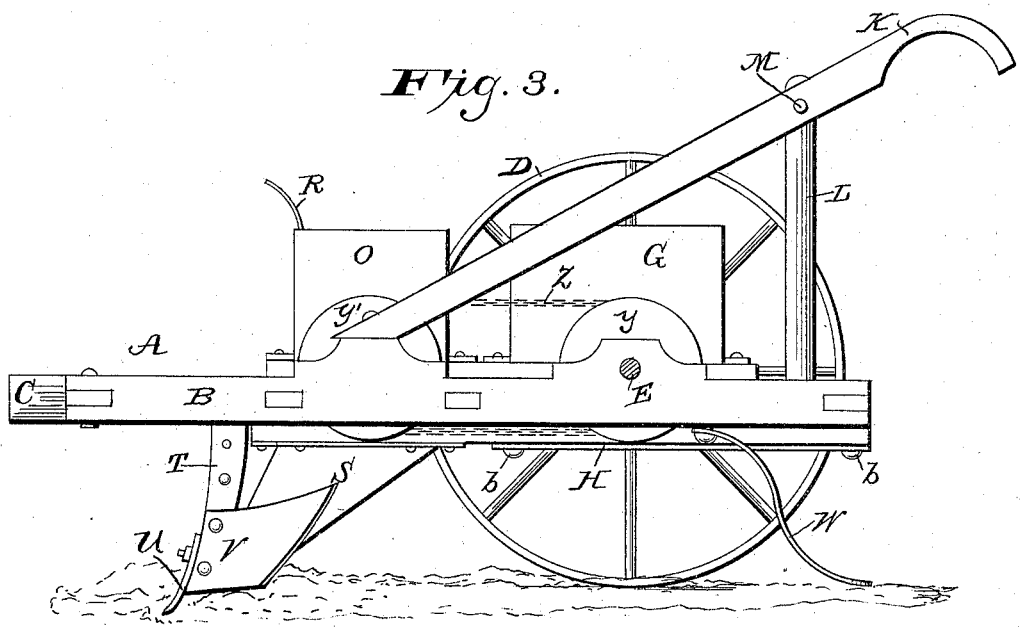
Figure 4:
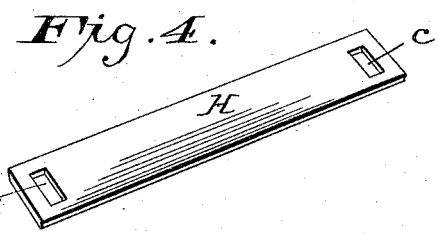
Figure 5:
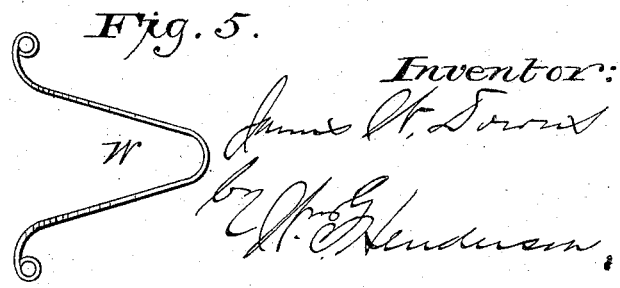

Figure 1 of the drawings is a plan view of the distributer; Fig. 2, a vertical longitudinal section; Fig. 3, a side elevation with one of the drive-wheels removed; Fig. 4, a perspective of the seed-box slide; Fig. 5, a plan of the seed-coverer detached from the distributer.

The letter A designates a frame composed of longitudinal bars B and cross-bars B', and having a tongue, C, to which the clevis may be attached. The frame is supported by drive-wheels D, which have a revolving axle, E, journaled in boxes F on the opposite longitudinal bars of the frame, as shown in Fig. 1 of the drawings. The rear part of the frame carries a seed-box, G, which has a longitudinal slot, $a$, formed in its bottom, the width of which may be controlled by an adjustable plate, H, secured to the under side of the frame or box by screws $b$, passed through elongated slots $c$ in the ends of the plate, so that by loosening said screws the plate can be moved back and forth sidewise to lessen the width of the slot in the box, as indicated by dotted lines in Fig. 1, so as to control the quantity of seed that shall pass through the slot. The arms or handles K are secured at their lower ends to the side bars of the frame and at their upper ends to standards L, rising up from the frame and braced by a cross-bar, M. The drive-axle also carries a toothed disk, N, which fits in the slot for the passage of the seed, and serves to feed the same from the box through the slot, so that it will drop into the furrow. The forward part of the frame carries a fertilizer box or hopper, O, of any approved form, formed with a longitudinal slot, $e$, in its bottom, and provided with a toothed disk, P, fitting in said slot, and supported by an axle, Q, passed through the sides of the box, and journaled so as to revolve in suitable boxes, F', on the opposite longitudinal bars of the frame. The toothed disk serves to feed the guano or other fertilizer through the slot, and is provided with a series of pins, $f$, projecting from opposite sides, which serve to break up the fertilizer and prevent the same from choking the box, and also assist in the feed of the same. The quantity of fertilizer that shall pass from the box is regulated by a slide, R, which passes through any suitable guide, $g$, on the inside of the box, and is slotted lengthwise from its lower end inwardly, so as to fit on opposite sides of the disk, as seen in Fig. 1. This slide is slightly curved, and by pressing it down it lessens the quantity of fertilizer to pass through the slot, and by raising it increases the quantity, and by adjusting it as described it can be made to lessen or increase the quantity fed one-tenth, or thereabout. The fertilizer passes from the box into an inclined spout, S, diminishing in size from top to bottom, and inclining forwardly to the standard T of the plow U, and terminating at or near the point of the plow, as seen in Figs. 1 and 2. The fertilizer is thus delivered at or near the plow and into the furrow quite as deep as the plow cuts.

In order to prevent the soil from falling back into the furrow before the fertilizer drops therein, wings V are secured to the opposite sides of the standard, as shown by full and dotted lines in Figs. 2 and 3 of the drawings. These wings permit the loose soil to fall back into the furrow after the fertilizer has been deposited and cover the fertilizer to the extent of from two to four inches, more or less, according to the depth of cut of the plow.

For instance, if the plow cuts six inches there will be, say, about four inches of soil thrown on top of the fertilizer. It will thus be seen that the guano is sown and then covered before the seed is sown on top of it, by which the most satisfactory results are obtained.

After the seed has been sown, as already described, the loose soil is drawn over the same by the coverer W, which is made of spring-steel of, say, half an inch in thickness, curved as shown, and secured to the under side of the rear part of the frame by screws passed through eyes formed at its ends, or in any other suitable manner found desirable. This coverer, being slightly elastic and curved downwardly and rearwardly and bent to form a loop, as shown, covers the seed most effectually and in the most desirable manner. The axles Q and E are provided with pulleys Y Y' in line with each other, and a chain, Z, connects the pulleys, so that motion is transmitted from the drive-axle to the axle of the feed-disk in the fertilizer-box.

The operation of the machine is apparent from the foregoing description, and a recapitulation thereof is unnecessary, and the merits of the invention, as set forth, will be appreciated by all persons having occasion to use machines of the kind to which the invention relates.

I lay no claim, broadly, to an adjustable slide in a fertilizer-box, nor to means for feeding the guano first and the seed afterward, but claim only the particular combinations specifically pointed out in the claims, whereby the feed of the fertilizer is better regulated and the seed planted to the best advantage.

Having described my invention, what I claim is—

1. The combination, with the fertilizer-box having the slot in its bottom opening into the delivery-spout, of the serrated feed-disk journaled within said box and fitting within said slot, and provided with the projecting pins, and the adjustable curved slide slotted from its lower end inwardly, and fitting on opposite sides of the disk from its lower portion upwardly in the front of the box, substantially as and for the purposes described.

2. The combination, with a plow to open the ground and means for feeding fertilizer and seed to the opened furrow, of the elastic coverer W, located to the rear of the feed mechanism and composed of a single elastic rod bent to form a loop and curved rearwardly and downwardly in two directions, as shown, to cover the seed dropped into the furrow, as set forth.

In testimony whereof I affix my signature in presence of two witnesses.

JAS. W. DOWNS.

Witnesses:
E. T. EVANS,
M. L. BROWN, Jr.